3,804,788
PAPER SIZING AGENT
Koji Funaoka, Saitama, and Tatsuro Miwa, Tokyo, Japan, assignors to Mitsubishi Oil Co., Ltd., Tokyo, Japan
No Drawing. Filed July 26, 1972, Ser. No. 275,406
Claims priority, application Japan, July 27, 1971, 46/55,675; June 16, 1972, 47/59,395
Int. Cl. C09j 3/26
U.S. Cl. 260—27 R
33 Claims

ABSTRACT OF THE DISCLOSURE

A sizing agent for use in paper-making is prepared by polymerizing a $C_4$ and/or a $C_5$ fraction containing diolefins or a mixture of a $C_4$ and/or a $C_5$ fraction containing diolefins with dicyclopentadiene to obtain a petroleum resin, reacting 100 parts by weight of the resulting petroleum resin having unsaturated bonds and a softening point of not higher than 40° C. with not less than 8 parts by weight of an $\alpha,\beta$-unsaturated dibasic acid to obtain an addition product, further reacting the resulting addition product with urea or ammonia to form a partially amidated petroleum resin, adding at least one of rosin, tall oil and modified products thereof, and then saponifying the mixture with an alkaline solution.

BACKGROUND OF THE INVENTION

(1) Field of the invention

This invention relates to a petroleum resin type sizing agent for use in paper-making. More specifically, it relates to a petroleum resin type sizing agent for use in paper-making which has an improved sizing effect, the sizing agent being obtained by polymerizing a $C_4$ and/or $C_5$ fraction containing diolefins or a mixture of such a fraction with dicyclopentadiene, reacting 100 parts by weight of the resulting petroleum resin having unsaturated bonds and a softening point of not higher than 40° C. with not less than 8 parts by weight of an $\alpha,\beta$-unsaturated dibasic acid, further reacting the resulting addition product with urea or ammonia to form a partially amidated petroleum resin, adding at least one of rosin, tall oil or the modified products thereof, and then saponifying the mixture with an alkaline solution.

(2) Description of the prior art

Conventional petroleum resin sizing agents are prepared generally by polymerizing a mixture of a $C_5$ fraction containing diolefins and a $C_9$ fraction containing aromatic olefins obtained as a by-product in the steam cracking of petroleum distillate, reacting maleic anhydride with the resulting solid petroleum resin having a softening point of 45° C. or higher and a bromine number of at least 25 to form an addition product, adding a small amount of rosin, modified rosin or a mixture of these to the addition product, and saponifying the mixture with an aqueous alkali solution. However, such sizing agents are inferior in sizing effect to rosin type sizing agents, especially when these sizing agents are used in small amounts.

Various proposals have previously been made to improve the sizing effect of petroleum resin type sizing agents. Typical methods are (1) a method in which the retention of sizing material by the pulp is improved (for example, Japanese patent publication No. 39,481/70), (2) a method in which the hydrophilicity of a maleic anhydride modified petroleum resin is lowered as much as possible (for example, Japanese patent publication No. 9,521/65), a method in which a suitable softening point is imparted in advance to the starting resin so that the sizing material built up on the pulp fiber is moderately cured to be properly filmed on the fiber at the heating temperature employed in the paper-making process (for example, Japanese patent publication Nos. 32,762/70 and 5,723/70).

However, in any of these methods of the prior art, the starting material is a petroleum resin having a softening point of at least 45° C. obtained by polymerizing a mixture of $C_5$ and $C_9$ fractions containing diolefins and aromatic olefins which has previously been used. Such methods do not contribute to a great improvement of the properties of the conventional petroleum resin type sizing agents, and cannot lead to any substantial improvement of the sizing effects of such sizing agents.

The inventors of the present invention observed that as long as a petroleum resin obtained by polymerizing a mixture of $C_5$ and $C_9$ fractions containing diolefins and aromatic olefins is used as a starting material, the sizing effect of a sizing agent obtained from this material can be improved only to a limited extent even if the material may be modified in any way, and made investigations on a new material resin and a method of modifying such material with a view to increasing the sizing effect.

When the conventional petroleum resin type sizing agents are compared with the conventional rosin-type sizing agents, it appears that both have substantially the same softening point and the former has higher hydrophobic properties than the latter, but that the latter has higher sizing effect. While not desiring to be bound, it is believed this is because these two types of sizing agents are different from each other in the condition as a film of the sizing resin on the surface of the pulp fiber after the heat-treatment step in paper making, especially, with respect to the uniformity or continuity of the film, and that the condition of the film is greatly affected not only by the softening point of the resin, but also by the affinity between the resin and the pulp fiber. From this standpoint, further studies were made in order to obtain a modified resin having high affinity for the pulp fiber and a suitable softening point while retaining the hydrophobic properties required for sizing materials. This led to the discovery that when a new method of modification is applied to a petroleum resin having a softening point of not higher than 40° C. which has been obtained by polymerizing a $C_4$ and/or $C_5$ fraction containing diolefins or a mixture of a $C_4$ and/or $C_5$ fraction with dicyclopentadiene, a petroleum resin type sizing agent having a sizing effect comparable to that of the rosin-type sizing agent and having good water-solubility can be prepared.

SUMMARY OF THE INVENTION

The present invention provides a sizing agent which is prepared by polymerizing a fraction containing diolefins having 4 and/or 5 carbon atoms or a mixture of this fraction with dicyclopentadiene to obtain a petroleum resin, reacting 100 parts by weight of the resulting petroleum resin having unsaturated bonds and a softening point of not higher than 40° C. with not less than 8 parts by weight of an $\alpha,\beta$-unsaturated dibasic acid to form an addition product, further reacting the resulting addition product with urea or ammonia to form a partially amidated petroleum resin, adding at least one of rosin, tall oil and the modified products thereof, and then saponifying the mixture with an alkaline solution.

DETAILED DESCRIPTION OF THE INVENTION

The present invention is based on a two-step modification process which comprises an addition reaction of an $\alpha,\beta$-unsaturated dibasic acid to a viscous petroleum resin obtained by polymerizing a $C_4$ and/or $C_5$ fraction containing diolefins or a mixture of a $C_4$ and/or $C_5$ fraction containing diolefins with dicyclopentadiene, at a high addition percentage, for example, at a rate far higher than the 5% by weight usually employed in the preparation of petroleum resin type sizing agents to increase the hydrophilicity of the resin, and then amidation of 5 to 80% of the carboxyl groups of the $\alpha,\beta$-unsaturated dibasic acid added thereby to reduce the hydrophilicity and increase the softening point of the resin to a level desired for a sizing agent. This technical concept is entirely different from the technique of improving the sizing effects of the conventional sizing agent of the petroleum resin type.

The starting resin used in this invention is a petroleum resin obtained by polymerizing a fraction (boiling at about 20 to about 80° C.) containing diolefins mainly having 5 carbon atoms, a fraction (boiling at about −15 to about +25° C.) containing diolefins mainly having 4 carbon atoms, a mixture of these fractions, each obtained during the steam cracking of a petroleum distillate or a crude oil, or a mixture of 100 parts by weight of this fraction or mixture with not more than 150 parts by weight of dicyclopentadiene, at about 0 to about 60° C. for about 0.5 to about 6 hours using a Friedel-Crafts catalyst such as aluminum chloride, stannic chloride, boron trifluoride or the complex compounds of boron trifluoride e.g. boron trifluoride-etherate, boron trifluoride-phenolate and boron trifluoride hydrate. Boron trifluoride and its complexes are preferred. The resulting resin is a viscous liquid at room temperature and has a softening point of not higher than 40° C. and an iodine number of 150 to 250.

For the starting petroleum resin used in this invention, the softening point and the reactivity with the $\alpha,\beta$-unsaturated dibasic acid are especially important. It is necessary that the starting petroleum resin contain unsaturated bonds capable of reacting with at least 8% by weight of the $\alpha,\beta$-unsaturated dibasic acid. This amount of unsaturated bonds is obtained with an iodine number of higher than about 150, and therefore, a starting petroleum resin having an iodine number of at least 150 is desirable.

The softening point of the sizing material should meet the heat treatment conditions required in the paper-making process. The preferred softening point of the two-step modified resin prepared, i.e., as a result of the partial amidation step, for the sizing agent of this invention is 40° to 100° C., more preferably, 50° to 90° C. As will be described hereinafter, the two-step modification process comprising the addition reaction of an $\alpha,\beta$-unsaturated dibasic acid and the amidation brings about an increase in the softening point, and in order to obtain a modified resin having the above-described preferred softening point range, the starting petroleum resin must have a softening point of not higher than 40° C.

In the polymerization of fractions containing diolefins having 4 or 5 carbon atoms formed in the course of the steam cracking of a petroleum distillate or crude oil, the main components to be polymerized are diolefins such as butadiene, isoprene, piperlyene or cyclopentadiene, and various monoolefins are believed to participate in the polymerization as secondary components. Accordingly, the properties of the starting petroleum resin obtained by polymerizing a $C_4$ and/or $C_5$ fraction containing diolefins vary according to the composition of the olefin fraction. Usually, the softening point of the obtained petroleum resin is about −10° C. to about +40° C., but at times it may be lower. In such a case, the modified petroleum resin obtained after the two-step modification process used in this invention still has a softening point lower than 50° C. which is the lower limit of the preferred softening point of a size resin. When the softening point of the starting petroleum resin is too low as in such a case, the olefin fraction is polymerized together with dicyclopentadiene, thereby to increase the softening point of the resin to the preferred value.

The research of the inventors has shown that dicyclopentadiene directly participates in the polymerization of the $C_4$ and/or $C_5$ olefin fraction, and with increasing content of the dicyclopentadiene, the reactivity of the resulting petroleum resin with $\alpha,\beta$-unsaturated acid or its anhydride gradually increases and its softening point rises. But when the content of dicyclopentadiene exceeds 150 parts by weight per 100 parts by weight of the olefin fraction, the resulting petroleum resin, in most cases, has a softening point higher than 40° C., and becomes unsuitable for the present invention.

The fraction containing diolefins having 4 and/or 5 carbon atoms may be of any composition if it contains diolefins as the main components to be polymerized. However, the presence of cyclopentadiene in the fraction is undesirable since a gel-like substance tends to form during polymerization, and it is desirable to remove most of cyclopentadiene from the fraction in advance. When dicyclopentadiene is used, it is not necessary to use pure dicyclopentadiene, and a hydrocarbon mixture containing dicyclopentadiene may also be used.

The addition reaction of the unsaturated dibasic acid, for example, maleic anhydride, to the starting petroleum resin is performed usually with stirring for 3 to 5 hours at 180 to 220° C. while the resin is in the molten state. The amount of the unsaturated dibasic acid to be used is from 8 parts by weight to the amount capable of reacting per 100 parts by weight of the resin, but the preferred amount is from 10 to 20 parts by weight. The resulting resin has a saponification number of about 90 to about 190.

In the past the amount of the unsaturated dibasic acid which has generally been employed has been about 5% by weight, and this means that the unsaturated dibasic acid adds to only about half of the starting petroleum resin material. On the other hand, in the present invention, about an equal molar or more amount of the unsaturated dibasic acid adds to the petroleum resin.

By this addition reaction, the softening point of the resin usually rises by about 20 to about 50° C. When the resulting acid added resin is saponified by an alkaline solution, it exhibits excellent stability and good water-solubility, but its sizing effect is too low for practical purposes. It is generally known that a sizing agent prepared by reacting more than 10% by weight of maleic anhydride to a petroleum resin has a poor sizing effect (see Japanese patent publication No. 11,121/66).

Other $\alpha,\beta$-unsaturated dibasic acids which can be used in this invention are, for example, itaconic acid, fumaric acid, or citraconic anhydride, and the addition reaction of these acids or acid anhydrides is substantially the same as that described for maleic anhydride.

In the preparation of the sizing agent of this invention, it is essential to decrease the saponification number of the unsaturated acid added resin and to reduce its hydrophilicity. This can be accomplished, with a view toward the extent of the improvement in the sizing effects and the water-solubility of the sizing agent, by the partial amidation of the carboxyl groups of the added unsaturated dibasic acid. The partial amidation of the unsaturated dibasic acid added resin is performed by reacting the resin in the molten state with ammonia or urea. Where urea is used, it should be added slowly into the molten unsaturated acid-added resin with stirring at a temperature of 110 to 250° C. preferably 150 to 200° C. The water formed by the reaction is preferably removed by the application of a reduced pressure or by the blowing of an inert gas as nitrogen, carbon dioxide, or hydrogen. The reaction is carried out until the formation of water ceases. For example, when the reaction temperature is 180 to 200° C., the reaction is completed in about 1 to 2 hours.

The amount of urea to be reacted is 0.05 to 0.8 equivalent, preferably 0.1 to 0.7 equivalent, based on the amount of the carboxyl groups present as indicated by the saponification number of the unsaturated acid-added resin. For example, an amidated resin obtained by reacting an unsaturated acid-added resin having a saponification number of 110 to 160 with 0.5 equivalent of urea has a saponification number of about 60 to about 80.

The amount of urea to be reacted with 100 parts of the unsaturated acid-added resin is expressed by the following equation.

Urea (parts by weight)=$(S/10 \times 60/112) \times (0.05-0.8$ equivalent)

$S$=the saponification number of the unsaturated acid-added resin

By the partial amidation, the softening point of the modified resin in increased by about 10 to about 40° C. additionally.

Where ammonia is used, ammonia gas is blown into the resin in the molten state at 150-200° C. with stirring. In the same way as in using the urea, the reaction is carried out so that 0.05 to 0.8 equivalent, preferably 0.1 to 0.7 equivalent, of the carboxyl groups as indicated by the saponification number of the unsaturated acid added resin is amidated. Ammonia gas is blown into the resin under conditions determined for the desired reaction equivalent with respect to the unsaturated acid-added resin, and the reaction equivalent is known by the rate of decrease in the saponification number of the unsaturated acid-added resin. When, for example, 0.5 equivalent of an unsaturated acid-added resin having a saponification number of 140 is to be amidated, ammonia gas may be reacted with the resin so that the saponification number of the resin reaches 70. In the case of amidation by ammonia gas, the softening point of the resin also rises by about 10 to about 40° C.

As described thus far, the size resin of this invention is obtained by adding the $\alpha,\beta$-unsaturated dibasic acid to the starting petroleum resin to increase its hydrophilicity, and then partially amidating the resin to reduce the hydrophilic groups. The extent of amidation is generally 0.05 to 0.8 equivalent, preferably 0.1 to 0.7 equivalent, based on the saponification number of the unsaturated acid-added resin. If the extent of the amidation is less than 0.05 equivalent, the extent of the reduction is hydrophilicity is small, and the sizing effect is not improved. If the extent of the amidation is above 0.8 equivalent, the amount of remaining carboxyl groups is too small to render transparent the water-solution of the sizing agent after the saponification with alkaline solution. If 1 mole of urea, or 2 moles of ammonia, is reacted per mole of the unsaturated acid-added to the resin (namely, if 1.0 equivalent of urea or ammonia is reacted), the saponification number of the resin becomes zero, and the resin cannot be saponified with an alkaline solution. Of course, a water-soluble sizing agent cannot be prepared from such a resin.

The partially amidated petroleum resin is mixed with not more than 100% by weight, usually not more than 50% by weight, based on the resin, of at least one of rosin, tall oil, or modified products thereof, for example, products modified with maleic anhydride or fumaric acid such as those disclosed in U.S. Pat. Nos. 2,628,918, 2,684,300, 3,251,732. The mixture is saponified with a solution containing 0.8 to 1.5 equivalent, preferably 1.0 to 1.3 equivalents, almost an equivalent, based on the saponification number of the mixture, of an alkali such as potassium hydroxide, sodium hydroxide, ammonia, or alkanolamines either alone or in admixture to give a sizing agent in accordance with this invention which has good water-solubility and remarkably superior sizing effect in comparison with conventional sizing agents of the petroleum resin type.

The following examples will illustrate in greater detail the method of preparing the sizing agent of this invention.

EXAMPLE 1

(1) A $C_5$ olefin fraction (boiling at 20-60° C.) which was formed in the steam cracking of a petroleum distillate and which contained 13% by weight of cis- and trans-piperylenes, 15% by weight of cyclopentadiene and its dimer, and 10% by weight of isoprene was polymerized using a boron trifluoride-ethyl ether complex as a catalyst. After the decomposition and removal of the catalyst and the removal of the unreacted material by distillation, a resin having a softening point of 37° C. was obtained. One-hundred and twenty g. of this resin and 17 g. of maleic anhydride were placed in a four-necked flask, and reacted with stirring at 190 to 200° C. to give 135 g. of a maleic anhydride modified resin having a saponification number of 130 and a softening point of 74° C.

(2) Seventy-two g. of the resin obtained and 1 g. (corresponding to 0.2 equivalent based on the saponification number of the resin) of urea were placed in a 200 cc. flask equipped with a dehydrating tube, and subjected to a dehydrating reaction for 2 hours at 200 to 210° C. with stirring while passing nitrogen gas to give 71 g. of a partially amidated resin having a saponification number of 105 and a softening point of 88° C.

(3) Fifty-five g. of the resin obtained, 15 g. of a maleic anhydride modified rosin having a saponification number of 280 and 30 g. of gum rosin were mixed and melted, and 100 g. of an aqueous solution containing 15 g. of potassium hydroxide was added gradually. Then, the mixture was maintained at 95 to 100° C. and saponification was carried out with stirring for 1 hour. The saponified product was diluted with 150 g. of water to form 350 g. of a sizing agent of this invention which was brown and transparent and had a solid content of 30% by weight.

EXAMPLE 2

(1) A $C_5$ olefin fraction containing 18% by weight of piperylene, 3% by weight of cyclopentadiene and 1% by weight of isoprene obtained by removing most of the cyclopentadiene and the isoprene from a $C_5$ olefin fraction obtained in the steam cracking of a petroleum distillate was polymerized and treated using the same procedure as set forth in Example 1 to form a viscous resin having a softening point of 18° C. Eighty g. of the resulting resin and 12 g. of maleic anhydride were reacted using the same procedure as described in Example 1 to form 91 g. of a maleic anhydride modified resin having a softening point of 64° C. and a saponification number of 135.

(2) Eighty g. of the resulting modified resin was reacted with 2.3 g. (corresponding to 0.4 equivalent based on the saponification number of the resin) of urea using the same procedure as described in Example 1 to form 81 g. of partially amidated resin having a saponification number of 82 and a softening point of 78° C.

(3) Seventy g. of the resin obtained, 10 g. of a maleic anhydride modified rosin having a saponification number of 280, and 20 g. of tall oil were mixed and melted, and a saponification was performed using 100 g. of an aqueous solution containing 12 g. of potassium hydroxide using the same procedure as described in Example 1. The saponified product was diluted with water to form 350 g. of a sizing agent of this invention which was brown and transparent and had a solid content of 30% by weight.

EXAMPLE 3

(1) One hundred g. of a petroleum resin having an iodine number of 180 and a pour point of −4° C. which was liquid at room temperature and obtained mainly from isobutylene and butadiene was reacted with 12 g. of maleic anhydride in the same manner as described in Example 1–(1) to form 110 g. of a maleic anhydride modified resin having a saponification number of 115 and a softening point of 36° C.

(2) One hundred g. of the resulting resin was placed in a 200 cc. four-necked flask and heated to 150 to 180° C. with stirring. Ammonia gas was introduced for 15 minutes into the resin from one side of the reactor. The unreacted ammonia gas was allowed to flow out from the other side and collected in dilute sulfuric acid. Then, the reaction mixture was heated to 180 to 200° C. and nitrogen gas was blown thereinto for 15 minutes so as to remove the ammonia gas and water which might remain in the reaction system. There was obtained 101 g. of a partially amidated resin having a saponification number of 55 and a softening point of 53° C. The saponification number of this modified resin demonstrates that about 0.5 equivalent of carboxyl groups of the starting maleic anhydride modified resin was amidated.

(3) Seventy g. of the resulting modified resin, 10 g. of a maleic anhydride modified rosin having a saponification number of 280 and 20 g. of gum rosin were mixed and melted, and a saponification was performed using 100 g. of an aqueous solution containing 10 g. of potassium hydroxide using the same procedure as set forth in Example 1–(3). The saponified product was diluted with water to form 350 g. of a sizing agent of this invention which was brown and transparent and had a solid content of 30% by weight.

For the purposes of comparison, a sizing agent prepared from a maleic anhydride modified petroleum resin having a high saponification number which was not amidated, and a sizing agent produced from a petroleum resin having a softening point of higher than 40° C. using the same method as used in this invention will be illustrated by the following comparative examples.

Comparative Example 1

The maleic anhydride modified resin having a saponification number of 130 and a softening point of 74° C., obtained as in Example 1–(1) was employed. Fifty-five g. of this resin, 15 g. of a maleic anhydride modified rosin and 30 g. of gum rosin were mixed and melted, and a saponification was performed using 100 g. of an aqueous solution containing 17 g. of potassium hydroxide using the same procedure as in Example 1. The saponified product was diluted with water to form 350 g. of a brown transparent sizing agent having a solid content of 30% by weight.

Comparative Example 2

(1) A starting resin (Toho Hi-Resin #60, a product of Toho Sekiyujushi K.K.) having a softening point of 63° C. and a bromine number of 54 prepared from a mixture of $C_5$ and $C_9$ fractions which is conventionally employed as a material for the production of a sizing agent of the petroleum resin type, was reacted with 12 g. of maleic anhydride in the same manner as described in Example 2–(1). The amount of the resin was 80 g. There was obtained 90 g. of a maleic anhydride modified resin having a saponification number of 134 and a softening point of 106° C.

(2) The resulting resin was reacted with urea in the same manner as described in Example 2–(2) to form a modified resin having a saponification number of 80 and a softening point of 122° C.

(3) The resin was saponified in the same manner as described in Example 2–(3) to form 350 g. of a red brown transparent sizing agent having a solid content of 30% by weight.

Comparative Example 3

(1) One hundred g. of the same starting resin as was used in Example 3 was reacted with 6 g. of maleic anhydride in the same way as in Example 3 to form a viscous maleic anhydride modified resin having a saponification number of 56 and a softening point of 14° C.

(2) The same saponification procedure as employed in Example 3–(3) was repeated except that the above modified resin was used instead of the partially amidated resin. There was obtained a semitransparent sizing agent having a solid content of 30% by weight.

Reference example.—The sizing effects of the sizing agents obtained in the above examples and comparative examples were compared along with a commercially available rosin-type sizing agent and a petroleum resin-type sizing agent. The test conditions were as follows:

Pulp: LBKP, Canadian freeness 360 cc.
Addition of sizing agent: weight percent as solid of sizing agent based on the pulp weight
Precipitation: 2.5% by weight of alum, pH 4.6
Drying: rotary dryer 105° C., 5 minutes
Sheet-formation: TAPPI test machine
Sizing effect: measured by the Stöchigt method (seconds)
Weight of the paper: 70 g./m.$^2$ The commercially available rosin-type sizing agent was Sizepine E (product of Arakawa Rinsan Kagaku Kogyo K.K. believed to be prepared by saponifying a mixture of gum rosin, tall rosin, and a maleic anhydride modified rosin) and the commercially available petroleum resin type sizing agent was Homosize 900 (product of Kindai Kagaku Kogyo K.K. believed to be prepared by saponifying a mixture of a maleic anhydride modified petroleum resin gum rosin, tall rosin and a maleic anhydride modified rosin).

The results obtained are shown in the following table.

MEASUREMENT OF SIZING EFFECT
(Seconds)

| Addition of sizing agent (percent) | 0.45 | 0.60 | 0.75 |
|---|---|---|---|
| Example 1 | 14 | 28 | 36 |
| Comparative Example 1 | 3 | 8 | 12 |
| Example 2 | 15 | 29 | 38 |
| Comparative Example 2 | 4 | 11 | 18 |
| Example 3 | 15 | 28 | 37 |
| Comparative Example 3 | 6 | 20 | 27 |
| Commercially available rosin-type sizing agent | 12 | 26 | 35 |
| Commercially available petroleum resin type sizing agent | 8 | 23 | 34 |

As can be seen from the results shown above, the sizing agents of this invention exhibit sizing effects equal to, or better than, those of the commercially available rosin type sizing agent, and exhibit far better sizing effects than those of the commercially available petroleum resin type sizing agent which was prepared from a maleic anhydride modified petroleum resin presumably produced from a mixture of $C_5$ and $C_9$ fractions. Thus, a remarkable improvement in sizing effect was observed.

Furthermore, the sizing agent obtained in Comparative Example 1 which was obtained from the maleic anhydride modified resin before partial amidation in the process of the preparation of the sizing agent in Example 1 has a very poor sizing effect, and this seems to confirm that the reduction in the saponification number of the resin is essential in obtaining the size of this invention. The sizing agent prepared in Comparative Example 2 which was obtained from a petroleum resin having a softening point of 63° C. was not suitable as a material for the production of the sizing agent of this invention, and exhibits a very poor sizing effect presumably because its softening point is beyond the preferred range specified in this invention. This indicates the necessity of using as a starting material a petroleum resin having a softening point of not higher than 40° C. and being a viscous liquid at room temperature which is obtained from a $C_5$ fraction of a petroleum cracked oil or from a fraction mainly contacting $C_4$ butadiene and isobutylene.

The sizing agent of Example 3 has far superior sizing effect to the effect of the sizing agent obtained in Comparative Example 3 using the maleic anhydride-modified petroleum resin having almost the same saponification number as that of the partially amidated resin, although the hydrophilicity of the former is the same as that of the latter.

EXAMPLE 4

(1) One hundred parts by weight of a $C_5$ olefin fraction containing 29% by weight of cis- and trans-piperylenes, 1% by weight of isoprene and 2% by weight of cyclopentadiene were mixed with 46 parts by weight of dicyclopentadiene. The mixture was polymerized for 4 hours at 30° C. using a boron trifluoride-ethyl ether complex as a catalyst. The catalyst was decomposed and removed, and the unreacted material was removed by distillation. One hundred g. of the resulting viscous resin having a softening point of 32° C. and 10 g. of maleic anhydride were placed in a 200 cc. four-necked flask, and stirred for 3 hours at 190 to 200° C. to form a maleic anhydride modified resin having a saponification number of 98 and a softening point of 45° C.

(2) One hundred g. of the resulting resin and 2.6 g. (corresponding to 0.5 equivalent) of urea were placed in a 200 cc. flask equipped with a dehydrating tube, and subjected to a dehydrating reaction with stirring at 200–210° C. for 80 minutes to form 102 g. of partially amidated resin having a saponification number of 51 and a softening point of 67° C.

(3) Sixty g. of the resulting resin, 20 g. of a maleic anhydride modified rosin having a saponification number of 280, and 20 g. of gum rosin were mixed and melted, and with stirring, 100 g. of an aqueous solution containing 13 g. of potassium hydroxide was gradually added. The mixture was maintained at 95 to 100° C. and the saponification was performed for one hour. The saponified product was diluted with 150 g. of water to form 350 g. of a sizing agent of this invention which was brown and transparent and had a solid content of 30% by weight.

EXAMPLE 5

(1) One hundred parts by weight of a $C_5$ olefin fraction containing 32% by weight of cis- and trans-piperylenes, 2% by weight of isoprene and 2% by weight of cyclopentadiene were mixed with 24 parts by weight of dicyclopentadiene. The mixture was polymerized and treated using the same procedure as described in Example 4–(1) to form a viscous resin having a softening point of 28° C. One hundred g. of the resulting resin and 12 g. of maleic anhydride were reacted using the same procedure as described in Example 4–(1) to form a maleic anhydride modified resin having a saponification number of 115 and a softening point of 45° C.

(2) One hundred g. of the resulting resin were placed in a 200 cc. flask, and heated to 150 to 160° C. With stirring, ammonia gas was introduced into the resin for 30 minutes from one side of the reactor, and unreacted ammonia gas was allowed to flow out from the other side of the reactor and collected in dilute sulfuric acid. Then, the temperature was raised to 180 to 200° C., and the reaction mixture was further maintained at this temperature for 30 minutes to remove any remaining ammonia gas and water formed by the reaction. There was obtained 102 g. of a partially amidated resin having a saponification number of 40 and a softening point of 69° C. The saponification number of this modified resin indicated that about 0.65 equivalent of the added maleic anhydride portion of the modified resin was amidated.

(3) Seventy g. of the resulting resin, 15 g. of a maleic anhydride modified rosin having a saponification number of 280 and 15 g. of gum rosin were mixed and melted, and a saponification was performed using 100 g. of an aqueous solution containing 10 g. of potassium hydroxide in the same manner as described in Example 4–(3). The saponified product was diluted with water to form 350 g. of sizing agent of this invention which was brown and transparent and had a solid content of 30% by weight.

EXAMPLE 6

(1) One hundred parts by weight of a $C_4$ olefin fraction containing 32% by weight of butadiene which was obtained in the steam cracking of a petroleum distillate were mixed with 40 parts by weight of dicyclopentadiene. The mixture was polymerized under pressure using a boron trifluoride-ethyl ether complex as a catalyst to form a viscous resin having a softening point of 18° C. One hundred g. of this resin was reacted with 18 g. of maleic anhydride in the same manner as described in Example 4–(1) to form a maleic anhydride modified resin having a saponification number of 152 and a softening point of 49° C.

(2) One hundred g. of the resulting modified resin was reacted with 5.7 g. (corresponding to 0.7 equivalent based on the saponification number of the resin) of urea in the same manner as described in Example 4–(2) to form 103 g. of a partially amidated resin having a saponification number of 48 and a softening point of 73° C.

(3) Eighty g. of the resulting resin, 15 g. of a maleic anhydride modified rosin having a saponification number of 280 and 5 g. of gum rosin were mixed and melted, and a saponification was performed using 100 g. of an aqueous solution containing 10 g. of potassium hydroxide in the same manner as set forth in Example 4–(3). The saponified product was diluted with water to form 350 g. of a sizing agent of this invention which was brown and transparent and had a solid content of 30% by weight.

The sizing agent obtained in Examples 4 to 6 were compared with commercially available rosin-type sizing agent (Sizepine E, product of Arakawa Rinsan Kagaku Kogyo K.K.) with respect to the sizing effect of a sized paper. The test was conducted under the following conditions.

Sheet-formation: TAPPI test machine
Pulp: LBKP, Canadian freeness 340 cc.
Filler: 20% by weight (based on the pulp) of clay
Addition of sizing agent: percent by weight as solid based on the pulp weight
Precipitation: 2% by weight based on the pulp weight of alum; pH 4.4.
Drying: rotary dryer, 105° C. x 3 minutes
Weight of the paper: 60 to 62 g./m.²
Sizing effect: measured by the Stöchigt method (seconds)

The results obtained are given in the following table.

MEASUREMENT OF SIZING EFFECT
(Seconds)

| Addition of sizing agent (percent) | 0.3 | 0.6 | 0.9 |
|---|---|---|---|
| Example 4 | 14 | 31 | 38 |
| Example 5 | 15 | 33 | 37 |
| Example 6 | 14 | 33 | 38 |
| Sizepine E | 8 | 26 | 31 |

It can be seen from the results contained in above table that the sizing agents of this invention have superior sizing effects to the rosin-type sizing agent.

EXAMPLE 7

(1) A $C_5$ olefin fraction containing 12% by weight of piperylene, 14% by weight of isoprene and 2% by weight of cyclopentadiene which was obtained by removing most of cyclopentadiene from a $C_5$ fraction obtained in the steam cracking of petroleum distillate was polymerized using a boron trifluoride-ethyl ether complex as a catalyst to form a viscous resin having a softening point of 16° C. Eighty g. of this resin was reacted with 16 g. of itaconic acid modified resin having a saponification number of 135 and a softening point of 52° C.

(2) Eighty g. of the resulting modified resin was reacted with 2.9 g. (corresponding to 0.5 equivalent based on the saponification number of the resin) of urea in the same manner as described in Example 4–(2) to form 81 g. of a partially amidated resin having a saponification number of 68 and a softening point of 73° C.

(3) Eighty g. of the resulting resin, 15 g. of a maleic anhydride modified rosin having a saponification number of 280 and 5 g. of gum rosin were mixed and melted, and a saponification was performed using 100 g. of an aqueous solution containing 12 g. of potassium hydroxide in the same manner as set forth in Example 4–(3). The saponified product was diluted with water to form 350 g. of a sizing agent of this invention which was brown and transparent and had a solid content of 30% by weight.

EXAMPLE 8

(1) One hundred parts by weight of a $C_5$ olefin fraction containing 18% by weight of piperylene, 2% by weight of isoprene and 3% by weight of cyclopentadiene which was obtained by removing most of the isoprene and the cyclopentadiene from a $C_5$ fraction obtained in steam cracking of a petroleum distillate were mixed with 30 parts by weight of dicyclopentadiene. The mixture was polymerized using a boron trifluoride-ethyl ether complex as a catalyst to form a viscous resin having a softening point of 34° C. One hundred g. of this resin was reacted with 16 g. of itaconic acid in the same manner as in Example 4–(1) to form an itaconic acid modified resin having a saponification number of 117 and a softening point of 55° C.

(2) One hundred g. of the resulting modified resin was reacted with 4.4 g. (corresponding to 0.7 equivalent based on the saponification number of the resin) of urea in the same manner as described in Example 4–(2) to form 103 g. of a partially amidated resin having a saponification number of 35 and a softening point of 75° C.

(3) Seventy g. of the resulting resin, 20 g. of a maleic anhydride modified rosin having a saponification number of 280 and 10 g. of gum rosin were mixed and melted, and a saponification was performed using 100 g. of an aqueous solution containing 12 g. of potassium hydroxide in the same manner as set forth in Example 4–(3). The saponified product was diluted with water to form 350 g. of a sizing agent of this invention which was brown and transparent and had a solid content of 30% by weight.

The sizing agent obtained in Examples 7 and 8 were compared with a commercially available rosin-type sizing agent (Sizepine E, product of Arakawa Rinsan Kagaku Kogyo K.K.) with respect to the sizing effect of sized paper. The test was conducted under the following conditions.

Sheet-formation: TAPPI test machine
Pulp: LBKP, Canadian freeness 340 cc.
Filler: 20% by weight (based on the pulp weight) of clay
Addition of sizing agent: percent by weight as solids based on the pulp weight
Precipitation: 2% by weight based on the pulp weight of alum; pH 4.4
Drying: rotary dryer, 105° C. x 3 minutes
Weight of the paper: 60 to 62 g./m.$^2$
Sizing effect: measured by the Stöchigt method (seconds)

The results are given in the following table.

MEASUREMENT OF SIZING EFFECT
(Seconds)

| Addition of sizing agent (percent) | 0.3 | 0.6 | 0.9 |
|---|---|---|---|
| Example 7 | 15 | 32 | 40 |
| Example 8 | 16 | 35 | 39 |
| Sizepine E | 9 | 27 | 30 |

It can be seen from the results contained in above table that the sizing agents of this invention also have superior sizing effects to the rosin-type sizing agent.

What is claimed is:

1. A sizing agent for use in paper-making prepared by:
   (A) polymerizing a member selected from the group consisting of (1) a first fraction consisting essentially C–4 olefin fraction containing diolefins, (2) a second fraction consisting essentially of $C_5$-olefin fraction containing diolefins, (3) mixtures of said first and second fractions and (4) mixtures of (1), (2) or (3) and not more than 150 parts by weight, based on 100 parts by weight of said (1), (2) or (3), of dicyclopentadiene, said fractions being obtained by the steam cracking of a petroleum distillate or a crude oil, to form a first petroleum resin having carbon-carbon unsaturation, a softening point of not higher than 40° C. and an iodine number of at least about 150;
   (B) reacting 100 parts by weight of said first petroleum resin with not less than 8 parts by weight, based on the weight of 100 parts of said first petroleum resin, of an $\alpha,\beta$-unsaturated dibasic acid or anhydride thereof to form an acid-modified petroleum resin containing carboxyl groups;
   (C) reacting said acid-modified petroleum resin with from 0.05 to 0.8 equivalent, based on the amount of carboxyl groups present in said acid-modified petroleum resin, of urea or ammonia to form a partial amide of said acid-modified petroleum resin;
   (D) forming a mixture of said partial amide with not more than 100% by weight, based on the weight of said partial amide, of at least 1 member selected from the group consisting of rosin, tall oil and modified products thereof; and
   (E) saponifying said mixture with an alkaline solution containing from 0.8 to 1.5 equivalents, based on the saponification number of said mixture, of an alkali.

2. The sizing agent of claim 1, wherein the amount of said $\alpha,\beta$-unsaturated dibasic acid or anhydride thereof ranges from 10 to 20% by weight based on the weight of said first petroleum resin.

3. The sizing agent of claim 1, wherein said $\alpha,\beta$-unsaturated dibasic acid or anhydride thereof is selected from the group consisting of maleic anhydride, fumaric acid, itaconic acid and citraconic anhydride.

4. The sizing agent of claim 1, wherein said $\alpha,\beta$-unsaturated dibasic acid or anhydride thereof is maleic anhydride.

5. The sizing agent of claim 1, wherein the amount of said rosin, tall oil or the modified products thereof in said mixture is not greater than 50 parts by weight for each 100 parts by weight of said partial amide.

6. The sizing agent of claim 1, wherein the amount of said alkali in said alkaline solution is essentially an equivalent based on the saponification number of said mixture.

7. The sizing agent of claim 1, wherein said first fraction has a boiling point of about $-15$ to about 25° C. and wherein said second fraction has a boiling point of about 20 to about 80° C.

8. The sizing agent of claim 1, wherein said first petroleum resin has an iodine number of from about 150 to about 250 and a softening point of from about $-10$ to 40° C.

9. The sizing agent of claim 1 wherein said first fraction consists essentially of a $C_4$-diolefin and wherein said second fraction consists essentially of a $C_5$-diolefin.

10. A process for producing a sizing agent for use in paper-making, which comprises:
   (A) polymerizing a member selected from the group consisting of (1) a first fraction consisting essentially of $C_4$-olefin fraction containing diolefins, (2) a second fraction consisting essentially of $C_5$-olefin fraction containing diolefins, (3) mixtures of said first and second fractions and (4) mixtures of (1), (2) or (3) and not more than 150 parts by weight, based on 100 parts by weight of said (1), (2) or (3), of dicyclopentadiene, said fractions being obtained by the steam cracking of a petroleum distillate or a crude oil, in the presence of a Friedel-Crafts catalyst to form a first petroleum resin having carbon-carbon unsaturation, a softening point of not higher than 40° C. and an iodine number of at least 150;
   (B) reacting 100 parts by weight of said first petroleum resin with not less than 8 parts by weight, based on the weight of 100 parts of said first petroleum resin, of an $\alpha,\beta$-unsaturated dibasic acid or anhydride thereof to form an acid-modified petroleum resin containing carboxyl groups;
   (C) reacting said acid-modified petroleum resin with from 0.05 to 0.8 equivalent, based on the amount of carboxyl groups present in said acid-modified petroleum resin, of urea or ammonia to form a partial amide of said acid-modified petroleum resin;

(D) forming a mixture of said partial amide with not more than 100% by weight, based on the weight of said partial amide, of at least 1 member selected from the group consisting of rosin, tall oil and modified products thereof; and (E) saponifying said mixture with an alkaline solution containing from 0.8 to 1.5 equivalents, based on the saponification number of said mixture, of an alkali.

11. The process of claim 10, wherein said polymerization is carried out at about 0 to about 60° C. for about 0.5 to about 6 hours.

12. The process of claim 10, wherein said Friedel-Crafts catalyst is boron trifluoride or a complex thereof.

13. The process of claim 10, wherein the amount of said $\alpha,\beta$-unsaturated dibasic acid or anhydride thereof, based on the amount of said first petroleum resin, ranges from 10 to 20% by weight.

14. The process of claim 10, wherein said reaction between said first petroleum resin and said $\alpha,\beta$-unsaturated dibasic acid or anhydride thereof is conducted at about 180° C. to about 220° C. for about 3 to about 5 hours with the resin in the molten state.

15. The process of claim 10, wherein said $\alpha,\beta$-unsaturated dibasic acid or anhydride thereof is selected from the group consisting of maleic anhydride, fumaric acid, itaconic acid and citraconic anhydride.

16. The process of claim 10, wherein said $\alpha,\beta$-unsaturated dibasic acid or anhydride thereof is maleic anhydride.

17. The process of claim 10, wherein the amount of said rosin, tall oil or the modified products thereof in said mixture is not greater than 50% by weight based on the weight of said partial amide.

18. The process of claim 10, wherein the amount of said alkali in said alkaline solution is essentially an equivalent based on the saponification number of said mixture.

19. The process of claim 10, wherein said alkali is selected from the group consisting of sodium hydroxide, potassium hydroxide, ammonia, an alkanolamine and mixtures thereof.

20. The process of claim 10, wherein said first fraction has a boiling point of from about −15 to about 25° C. and wherein said second fraction has a boiling point of from about 20 to about 80° C.

21. The process of claim 10, wherein said first petroleum resin has an iodine number of from about 150 to about 250 and a softening point of from about −10 to 40° C.

22. The sizing agent of claim 1 wherein said polymerization is conducted at 0 to 60° C. for from 0.5 to 6 hours in the presence of a Friedel-Crafts catalyst.

23. The sizing agent of claim 1 wherein the softening point of said partial amide is from 40 to 100° C.

24. The sizing agent of claim 1 wherein the reaction between said first petroleum resin and said dibasic acid or anhydride thereof is conducted at a temperature of from 180 to 220° C. for from 3 to 5 hours with the resin in the molten state.

25. The sizing agent of claim 1 wherein said acid-modified petroleum resin has a saponification number of about 90 to about 190 and a softening point of from 20 to 50° C.

26. The sizing agent of claim 1 wherein said acid-modified petroleum resin is reacted with urea by adding the urea to said acid-modified petroleum resin in the molten state with stirring at a temperature of from 110 to 250° C. and wherein the softening point of the resulting partial amide is from about 10 to about 40° C. higher than the softening point of said acid-modified petroleum resin.

27. The sizing agent of claim 1 wherein said acid-modified petroleum resin is reacted with ammonia by blowing ammonia gas into said acid-modified petroleum resin in the molten state at a temperature of from 150 to 200° C. with stirring wherein the softening point of the resulting partial amide is from about 10 to about 40° C. higher than the softening point of the acid-modified petroleum resin.

28. The sizing agent of claim 1 wherein said modified products of said rosin and said tall oil comprise the maleic anhydride or fumaric acid-modified products of rosin and tall oil.

29. The sizing agent of claim 1 wherein said alkali in said alkaline solution is selected from the group consisting of potassium hydroxide, sodium hydroxide, ammonia, an alkanolamine and mixtures thereof.

30. The process of claim 10 wherein said acid-modified petroleum resin is reacted with urea by adding the urea to said acid-modified petroleum resin in the molten state at a temperature of from 110 to 250° C. and wherein the softening point of the resulting partial amide is from about 10 to about 40° C. higher than the softening point of said acid-modified petroleum resin.

31. The process of claim 10 wherein said acid-modified petroleum resin is reacted with ammonia by blowing ammonia gas into said acid-modified petroleum resin in the molten state at a temperature of from 150 to 200° C. and wherein the softening point of the resulting partial amide is from about 10 to about 40° C. higher than the softening point of said acid-modified petroleum resin.

32. The process of claim 10 wherein said modified products of said rosin and tall oil comprise the maleic anhydride or fumaric acid-modified products of rosin and tall oil.

33. The process of claim 10 wherein said first fraction consists essentially of a $C_4$-diolefin and wherein said second fraction consists essentially of a $C_5$-diolefin.

References Cited
UNITED STATES PATENTS

| | | | |
|---|---|---|---|
| 3,379,663 | 4/1968 | Takei et al. | 260—23.7 |
| 3,299,034 | 1/1967 | Nishiurg | 260—101 |

DONALD E. CZAJA, Primary Examiner

W. E. PARKER, Assistant Examiner

U.S. Cl. X.R.

162—168; 260—23.7 R, 101